T. C. JOHNSON.
BOLT ACTION GUN.
APPLICATION FILED JULY 22, 1919.
1,331,154.
Patented Feb. 17, 1920.
5 SHEETS—SHEET 5.
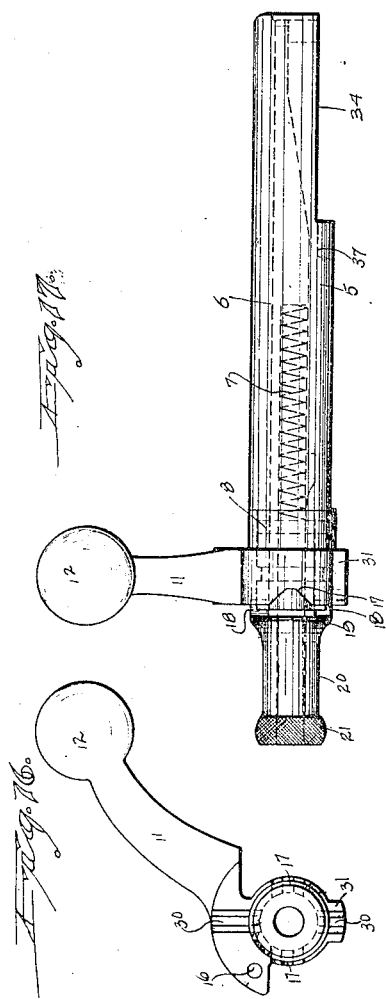

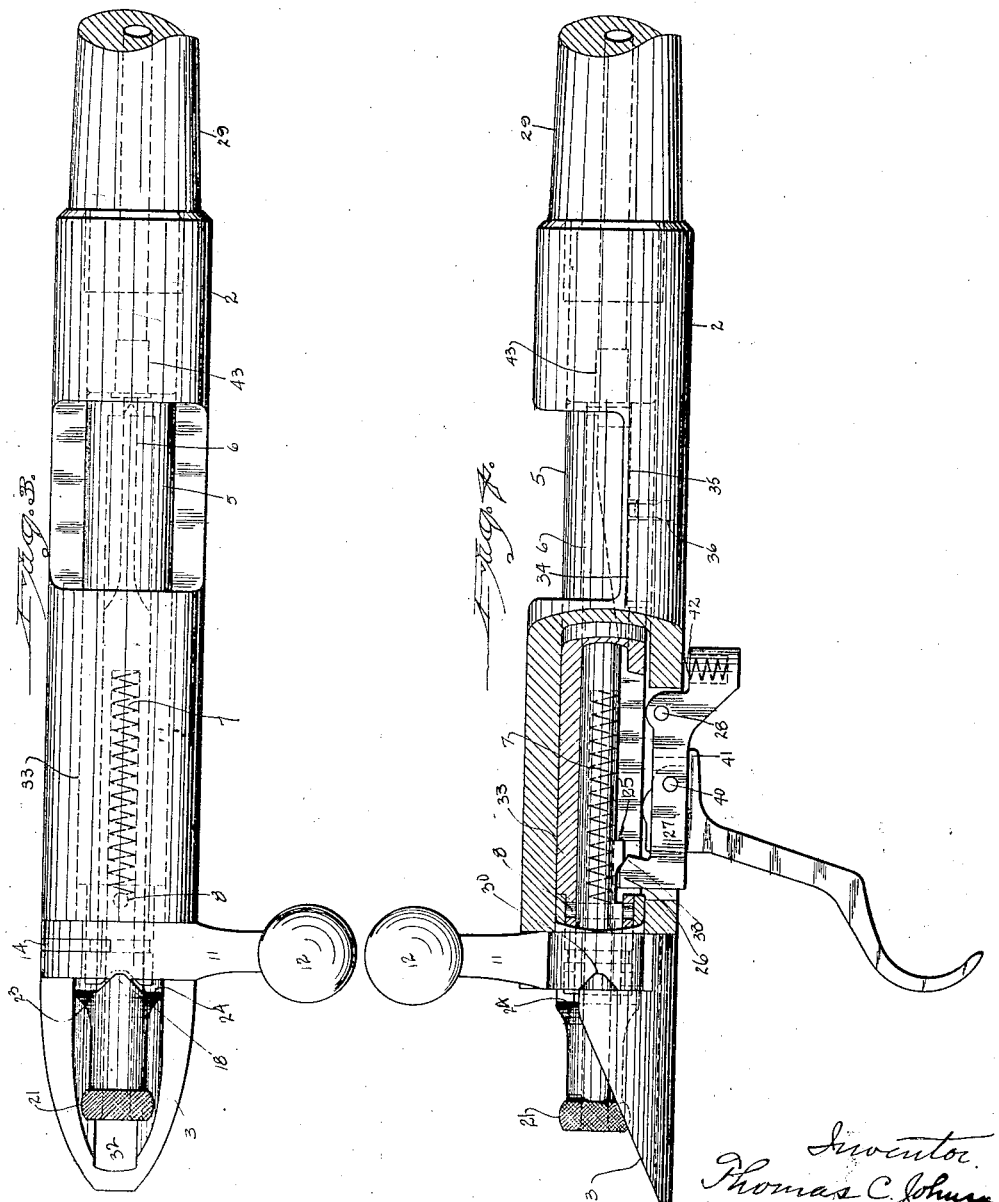

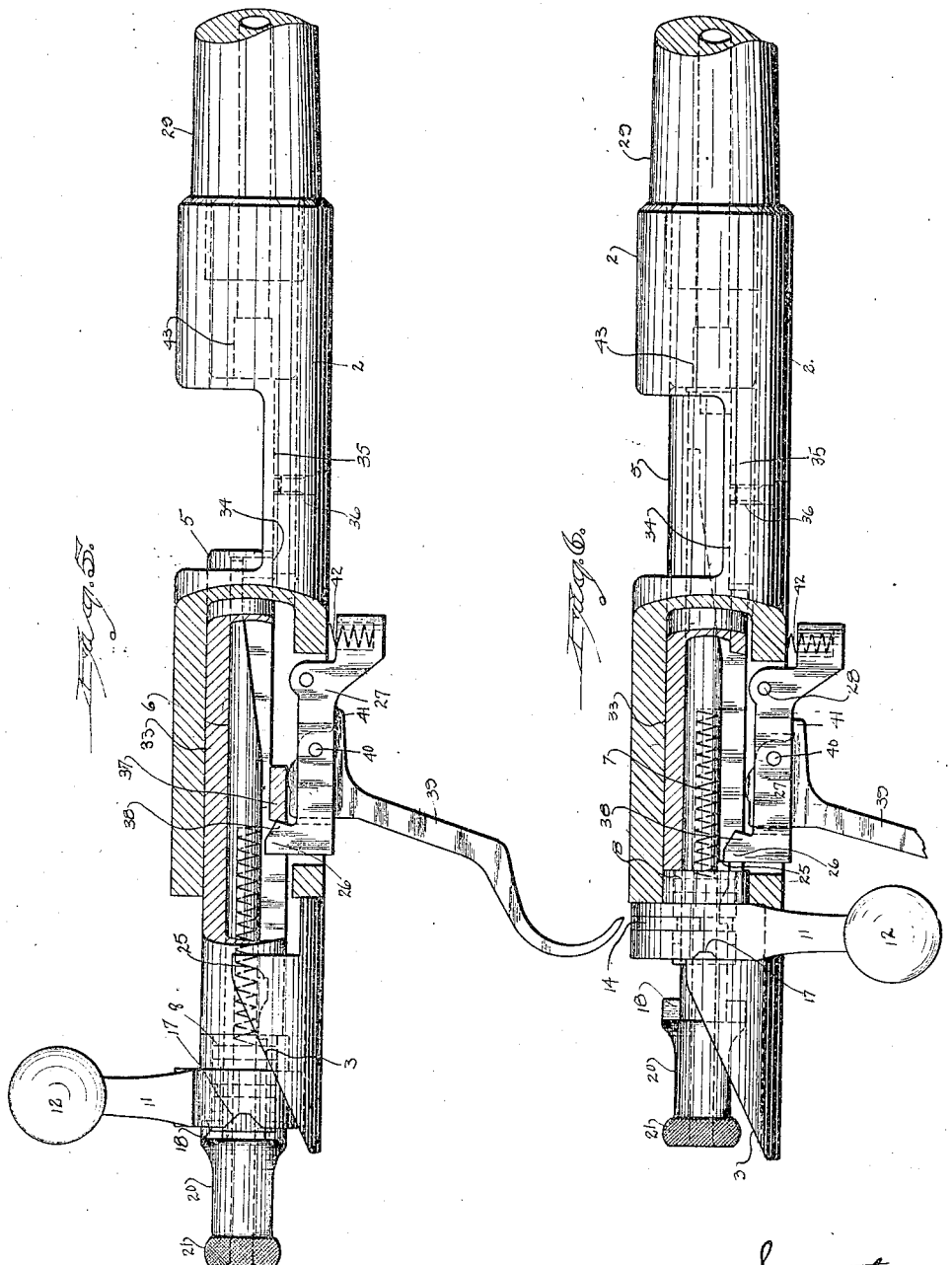

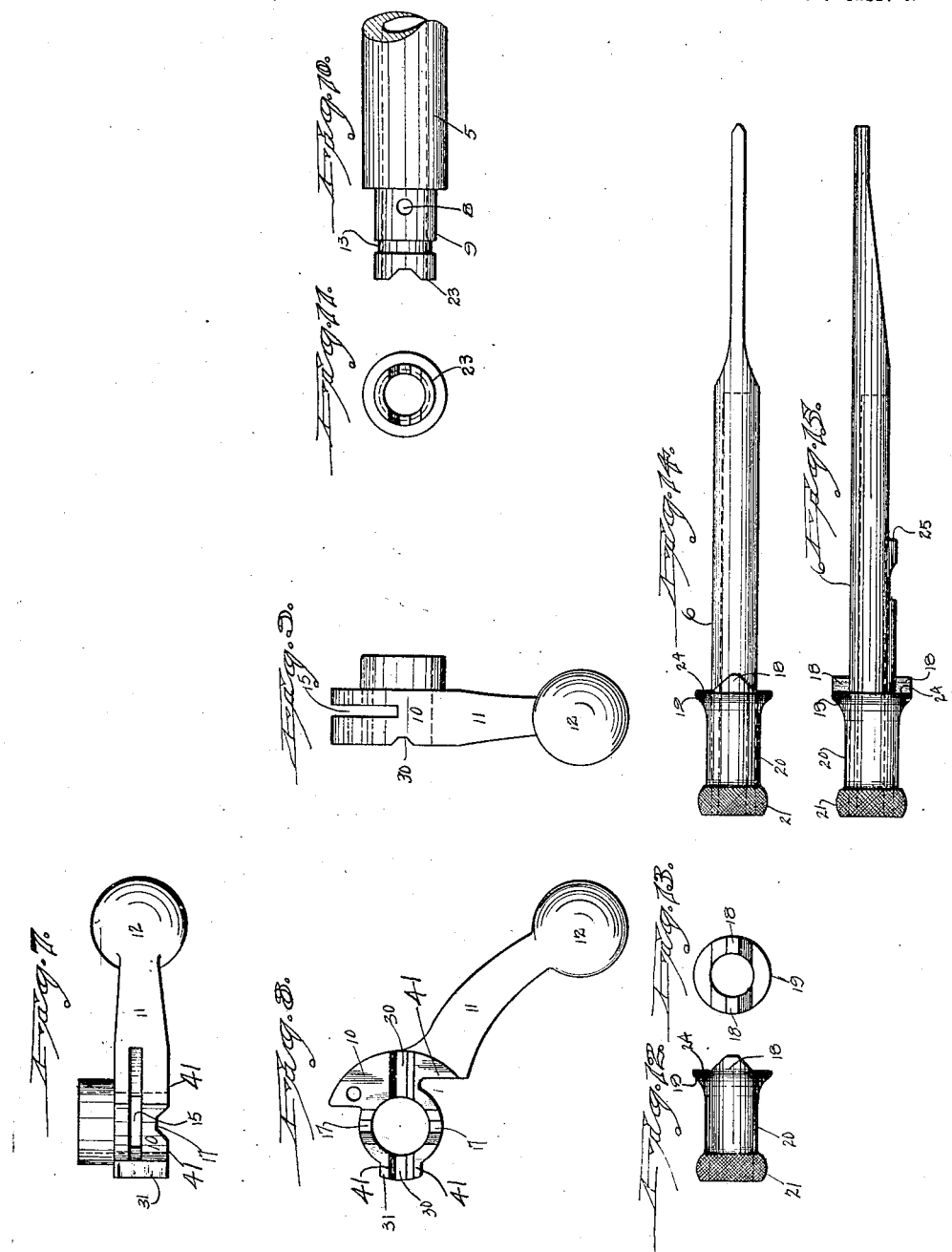

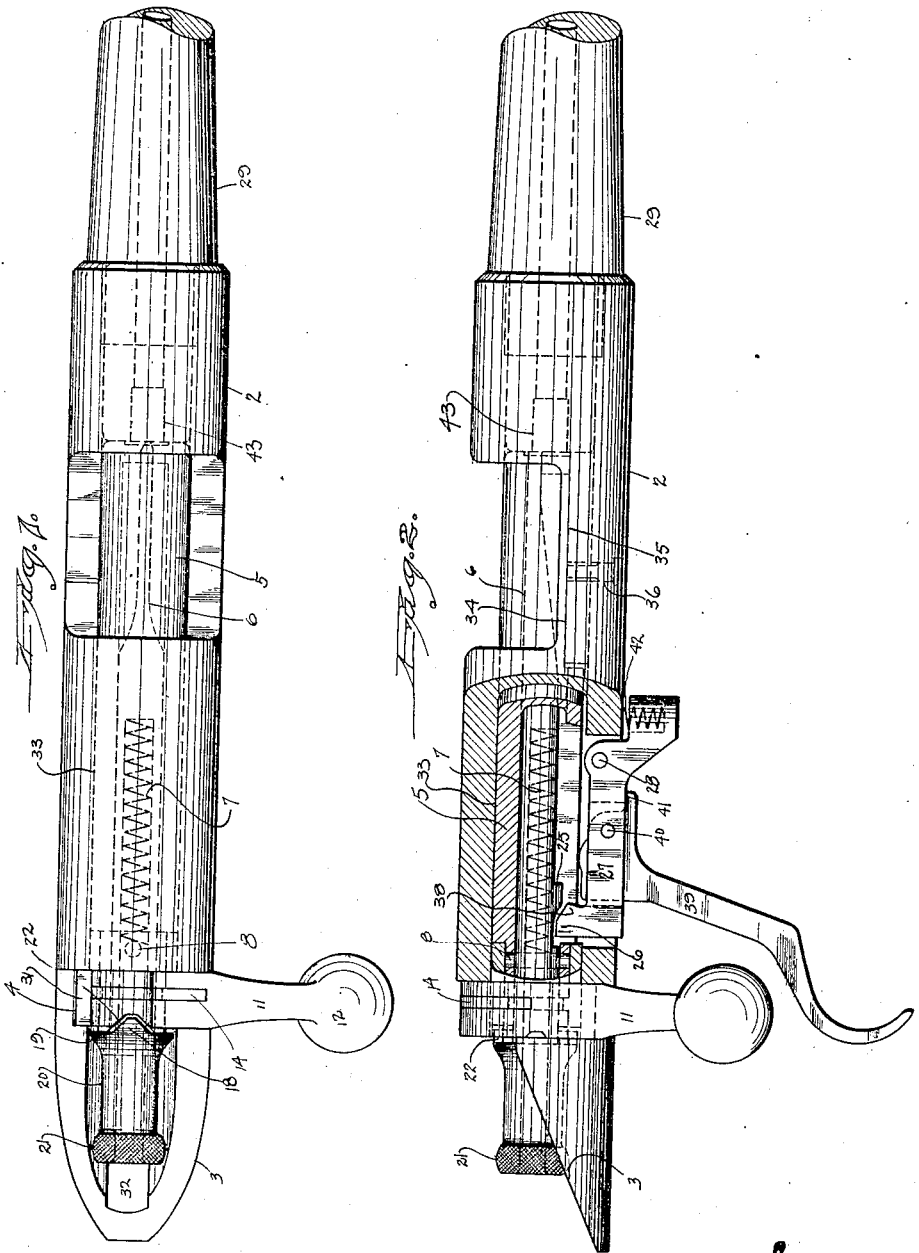

UNITED STATES PATENT OFFICE.

THOMAS C. JOHNSON, OF NEW HAVEN, CONNECTICUT, ASSIGNOR TO WINCHESTER REPEATING ARMS CO., OF NEW HAVEN, CONNECTICUT, A CORPORATION.

BOLT-ACTION GUN.

1,331,154.          Specification of Letters Patent.     Patented Feb. 17, 1920.

Application filed July 22, 1919. Serial No. 312,521.

*To all whom it may concern:*

Be it known that I, THOMAS C. JOHNSON, a citizen of the United States, residing at New Haven, in the county of New Haven and State of Connecticut, have invented a new and useful Improvement in Bolt-Action Guns; and I do hereby declare the following when taken in connection with the accompanying drawings and the characters of reference marked thereon, to be a full, clear, and exact description of the same, and which said drawings constitute part of this application, and represent, in—

Figure 1 a plan view of a gun constructed in accordance with my invention, shown as locked and with its barrel broken away.

Fig. 2 a view thereof, partly in side elevation and partly in vertical section.

Fig. 3 a plan view showing the gun as unlocked, but not opened.

Fig. 4 a corresponding view, partly in side elevation, and partly in vertical section.

Fig. 5 a view of the gun partly in side elevation and partly in vertical section with the bolt retracted.

Fig. 6 a similar view showing the gun as closed and cocked.

Fig. 7 a detached plan view of the bolt-handle showing its firing-pin retracting-notch.

Fig. 8 a rear view thereof.

Fig. 9 a view thereof in right hand side elevation, showing one of its alining-notches.

Fig. 10 a detached view in side elevation of the rear end of the bolt of the gun.

Fig. 11 a view thereof in rear elevation.

Fig. 12 a detached plan view of the sleeve-like firing-pin head.

Fig. 13 a view thereof in front elevation showing its firing-pin retracting cams.

Fig. 14 a detached plan view of the firing-pin.

Fig. 15 a view thereof in side elevation.

Fig. 16 a detached view in rear elevation of the bolt, bolt-handle and firing-pin as assembled into a unit.

Fig. 17 a view thereof in side elevation.

My invention relates to an improvement in bolt-action guns of the type in which a non-rotatable bolt has a locking and operating handle pivotally mounted upon its rear end, the object being to produce a simple, durable and efficient gun of the type described, with particular reference to convenience of manipulation and safety in use.

With these ends in view, my invention consists in a bolt-action gun having certain details of construction and combinations of parts as will be hereinafter described and pointed out in the claims.

In carrying out my invention as herein shown, I employ a receiver 2 the upper rear corner of which is cut away rearwardly and downwardly to produce a tapered receiver-terminal 3 which is partially separated from the body of the receiver by a transverse locking-slot 4 the rear wall of which provides bolt-locking abutments on the laterally opposite sides of the axis of a non-rotatable bolt 5 confined to linear movement in the receiver and having installed within it, a firing-pin 6 operated in its forward throw by a helical firing-pin spring 7 held in place at its rear end by a pin 8. The rear end of the said bolt is formed with a stem 9 forming a trunnion for the hub 10 of the bolt-handle which also comprises an integral lever 11 terminating in a ball 12. An annular groove 13 in the stem 9 receives a flat handle-key 14 fitting into a key-slot 15 in the handle-hub 10 and held therein by a pin 16, whereby the handle is pivotally mounted upon the rear end of the non-rotatable bolt.

In the rear face of the handle-hub 10 are formed two vertically alined firing-pin retracting cam-notches 17 for coaction with two corresponding forwardly projecting, vertically arranged firing-pin retracting cams 18 located upon the forward face of an annular flange 19 at the forward end of a sleeve-like head 20 mounted upon the projecting rear end of the firing-pin 6 and furnished at its rear end with a knurled fillet or grip 21. When the bolt-handle occupies its locked position as shown in Figs. 1 and 2, its said notches 17 are brought into the vertical plane, and therefore into alinement with the cams 18 which are drawn into the said notches by the action of the firing-pin spring 7. It will be noticed in Fig. 1, that there is a slight clearance-space 22 between the notches 17 and cams 18 when the gun is locked, and the firing-pin is in its fired position. This clearance-space is designed to prevent the battering of the cams 18 against the walls of the notches 17 when the firing-pin leaps forward under the action of its spring 7, this space being provided for by making the bolt-stem 9 sufficiently long to project rearwardly through the hub 10 of the bolt-handle as shown at 23 in Fig. 3, from which it is apparent that when the firing-pin moves forward, the forward face 24 of its flange 19 will impinge upon the end 23 of the bolt-stem 9 before the faces of the cam 18 can engage with the walls of the notches 17.

When the handle-lever 11 is shifted for the purpose of unlocking the bolt preparatory to the opening thereof, the right hand bevels of the lugs 18 engage with the right hand walls of the notches 17 and cam back the firing-pin 6 against the tension of its spring 7 before any opening movement of the bolt takes place. The firing-pin is thereafter held in its retracted position by the handle during the entire rearward excursion of the bolt-unit and during that portion of the forward excursion thereof which precedes the engagement of the sear-notch 25 of the firing-pin 6 with the sear-nose 26 of the sear 27 which is hung on a pin 28 passing through its forward end, thus preventing the firing-pin under any circumstances, from leaping forward until the bolt is closed and the handle has been turned downward into its fully locked position, at which time, with the firing-pin thus held by the sear from moving forward, the bolt is pushed forward by its handle to the limit of its forward excursion. During this last phase of the forward movement of the bolt, the firing-pin spring 7 is placed under tension. If at any time after the bolt begins to move forward independently of the firing-pin, the same should be accidentally released, as for instance, by the premature pulling of the trigger, a cartridge in the chamber 43 of the barrel cannot be exploded, because the cams 18 carried by the firing-pin would then engage with the rear face of the handle-hub 10 and prevent the firing-pin from moving forward far enough to strike the cartridge. However, the turning of the bolt-handle into its fully locked position brings its notches 17 into alinement with the cams 18, so that not until the gun is closed and locked, can it be fired.

In another view of my inprovement, the firing-pin by being positively held in its retracted position during the loading of the cartridges into the chamber 43 of the barrel 29, is prevented from interfering with the free movement of the cartridges across the face of the bolt during the loading operation.

The bolt 5, firing-pin 6 and the bolt-handle are organized together to form what I shall term a bolt-unit, (Figs. 16 and 17), which is handled as such in assembling and disassembling the gun, especially for cleaning the gun from the rear. In order to facilitate the introduction of the bolt-unit into the rear end of the receiver, it is desirable that its parts shall be held in predetermined auto-relations. For this purpose, the rear face of the handle-hub 10 is formed with two oppositely located, shallow alining notches 30 which receive the cams 18 of the sleeve-like head 20 of the firing-pin 6 when the handle is in its extreme elevated position, at which time the guide-lug 31 offsetting from the handle-hub 10 is registered with a guide-slot 32 cut in the tapered receiver-terminal 3 and located below the floor of the bolt-chamber 33 in the receiver, whereby the handle though pivotally mounted upon the bolt, is held under tension of the firing-pin spring 7 in quasi-rigid relations with the bolt, it being understood that when the handle is lifted to unlock the gun, the notches 30 are brought into engagement with the cams 18 and are so held by the firing-pin spring. The bolt and handle retain these relations when the bolt-unit is removed from the gun. Now when the bolt-unit is reintroduced into the gun, the bolt will be positioned in the bolt-chamber 33 in the receiver by the engagement of the flat bearing-face 34 upon its forward end with the flat upper face of a bolt-guide 35, which is held in place by a screw 36. This engagement of parts is automatically followed by the alinement of the guide-lug 31 of the bolt-handle with the guide-slot 32 in the receiver-terminal 3. From the moment the lug 31 enters the slot 32, the bolt-unit is forwardly guided into its home position. Thus, by utilizing the firing-pin and its spring to hold the bolt-handle in quasi-rigid relation to the bolt when the bolt-unit is out of the gun, I am able very conveniently to reintroduce the same into the gun.

When the bolt is drawn to the limit of its rearward excursion, the rear edge of a web 37 forming a part of the bolt, engages with the forward corner 38 of the sear-nose 26 and prevents the bolt-unit from being withdrawn from the receiver. When, however, it is desired to withdraw the bolt-unit from the receiver, the trigger 39 which is hung in the sear on the pin 40 is pushed forward, whereby a lug 41 upon the trigger engages with the lower face of the sear 27 and draws the point 38 of the sear away from the rear edge of the said web 37 thus permitting the bolt-unit to be withdrawn from the gun. The reverse operation takes place when the bolt-unit is reintroduced into the gun. Normally the sear is held in position for retaining the bolt-unit in the gun by means of the sear-spring 42 which also functions as a spring for the trigger 39.

The rear face of the bolt-handle is provided with recoil-taking surfaces located substantially on opposite sides of the axis on which the handle turns, and co-acting with the front face of the rear wall of the locking-slot 4 in the receiver 2, for taking the shock of the recoil. By providing the bolt-handle and the firing-pin with a plurality of retracting cams and notches located on opposite sides of the axis of the firing-pin, the power required to operate the handle for the retraction of the pin is reduced and the action made more positive and with less strain upon the parts involved. Furthermore, in case the firing-pin is snapped when the gun is unlocked, the firing-pin-retracting cams will simultaneously impinge upon the flat face of the handle and equalize the strain and shock of such impact. This avoids the tendency of such a happening to bend the firing-pin as occurs in guns of the prior art having but a single retracting-cam located on one side of the axis of the pin.

I claim:—

1. A bolt-action gun having a receiver formed with a transverse locking-slot, a non-rotatable bolt located in the said receiver, a firing-pin installed in the said bolt, and a handle pivotally mounted upon the bolt at the rear end thereof and formed upon its rear face with two firing-pin retracting-cam notches and with two alining notches, for co-action with the firing-pin, and also formed with recoil-taking faces co-acting with the rear wall of the said transverse locking-slot.

2. A bolt-action gun having a receiver, a bolt non-rotatably mounted therein, a firing-pin installed in the bolt, a handle pivotally mounted upon the rear end of the bolt, a sear pivotally mounted in the receiver and coacting with the firing-pin for firing the same and also coacting with the bolt for preventing the extraction of the bolt-unit from the gun, and a trigger pivotally mounted in the sear, whereby, by pushing forward upon the trigger, the sear is rocked upon its pivot beyond its normal position to permit the bolt to be withdrawn.

In testimony whereof, I have signed this specification in the presence of two subscribing witnesses.

THOMAS C. JOHNSON.

Witnesses:
FRANK A. PAUL,
ARTHUR W. EARLE.